United States Patent
Lee et al.

(10) Patent No.: US 8,135,023 B2
(45) Date of Patent: Mar. 13, 2012

(54) DATA PACKET, SYSTEM AND METHOD FOR MULTIPLE NODES TRANSMITTING UNDER AD-HOC NETWORK ARCHITECTURE

(75) Inventors: Ta-Yung Lee, Hsinchu (TW); Chih-Wen Cheng, Hsinchu (TW); Cheng-Hsien Yang, Hsinchu (TW); Chia-Chuan Wu, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 586 days.

(21) Appl. No.: 12/258,031

(22) Filed: Oct. 24, 2008

(65) Prior Publication Data
US 2010/0103909 A1    Apr. 29, 2010

(51) Int. Cl.
H04L 12/66    (2006.01)
(52) U.S. Cl. ........................ 370/401; 370/468
(58) Field of Classification Search .............. None
See application file for complete search history.

(56) References Cited

U.S. PATENT DOCUMENTS

| | | | | |
|---|---|---|---|---|
| 6,028,857 A * | 2/2000 | Poor | .............. | 370/351 |
| 7,006,481 B2 * | 2/2006 | Terry | .............. | 370/338 |
| 7,263,075 B2 * | 8/2007 | Roh et al. | .............. | 370/310 |
| 7,403,492 B2 * | 7/2008 | Zeng et al. | .............. | 370/254 |
| 7,489,688 B2 * | 2/2009 | Giesberts et al. | .............. | 370/392 |
| 7,590,118 B2 * | 9/2009 | Giesberts et al. | .............. | 370/392 |
| 7,672,307 B2 * | 3/2010 | Duggi et al. | .............. | 370/392 |
| 2003/0210700 A1 * | 11/2003 | Chen | .............. | 370/401 |
| 2004/0077374 A1 * | 4/2004 | Terry | .............. | 455/552.1 |
| 2005/0041591 A1 * | 2/2005 | Duggi et al. | .............. | 370/238 |
| 2005/0128958 A1 * | 6/2005 | Hamdan | .............. | 370/254 |
| 2005/0185632 A1 | 8/2005 | Draves, Jr. et al. | | |
| 2006/0114874 A1 * | 6/2006 | Terry | .............. | 370/338 |
| 2008/0112355 A1 * | 5/2008 | Krishnakumar et al. | ..... | 370/328 |
| 2008/0123562 A1 * | 5/2008 | Florit et al. | .............. | 370/258 |
| 2009/0232152 A1 * | 9/2009 | Chen | .............. | 370/419 |

* cited by examiner

*Primary Examiner* — Gregory Sefcheck

(57) ABSTRACT

A system and method are provided for multiple nodes to wirelessly transmit in an Ad-hoc network architecture. First of all, an integration module of the system integrates a multi-node transmission protocol into a reservation column of a data packet. Next, an initial node of the system transmits the integrated data packet. Afterwards, according to the multi-node transmission protocol, one or more bridge node of the system receives the integrated data packet transmitted from the initial node. And finally, according to the multi-node transmission protocol, a destination node of the system receives the integrated data packet transmitted from the bridge node. By means of the proposed system and method, data transmission between multiple nodes is achieved under the Ad-hoc network architecture.

14 Claims, 4 Drawing Sheets

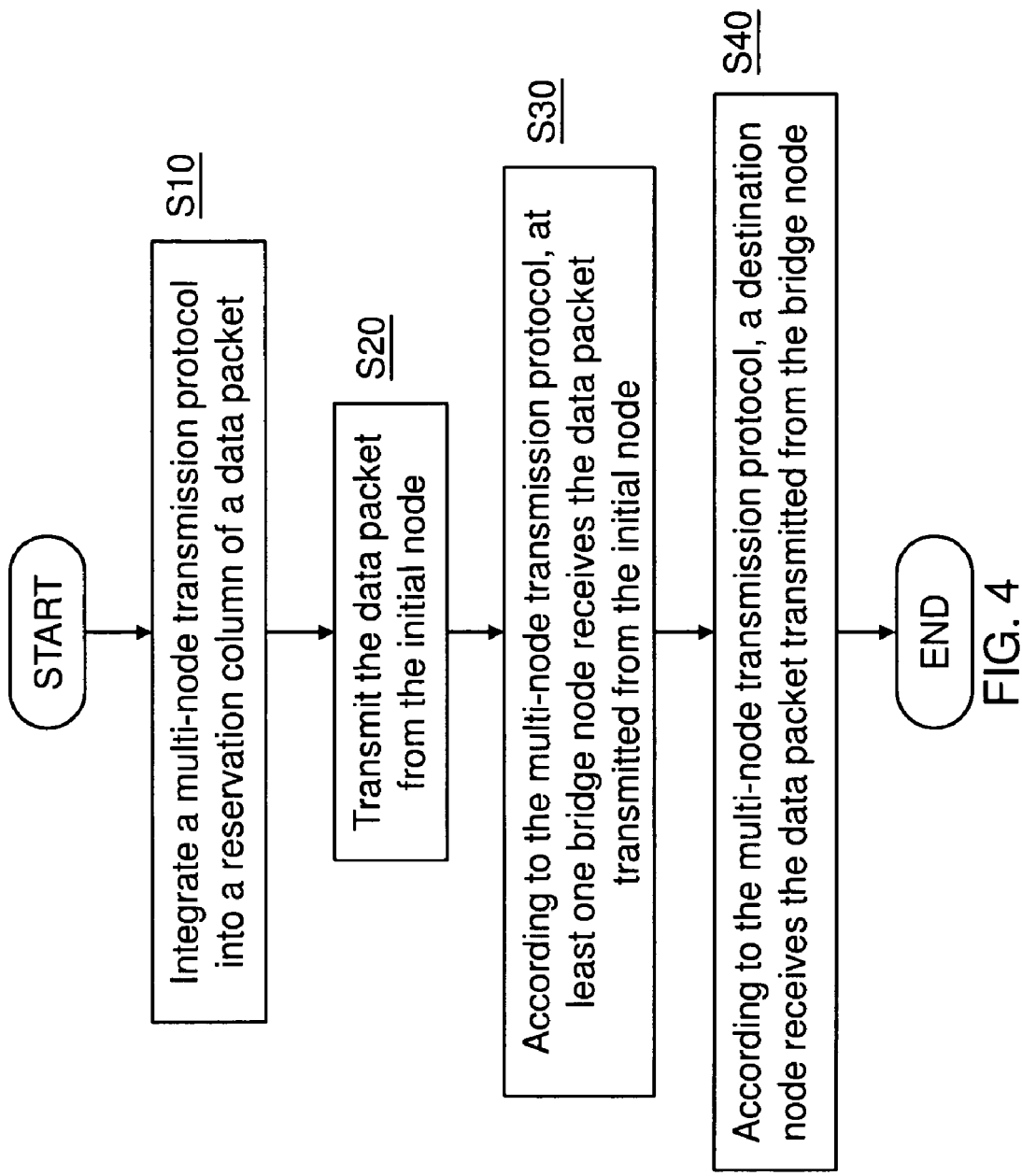

DATA PACKET, SYSTEM AND METHOD FOR MULTIPLE NODES TRANSMITTING UNDER AD-HOC NETWORK ARCHITECTURE

FIELD OF THE INVENTION

The present invention relates to a multi-node transmission system and method, in particular, to a system and method for multiple nodes transmitting in an Ad-hoc network architecture.

RELATED ART

General wireless network architecture requires an access point (wireless network bridge), to operates as a bridge between a conventional cable-based local area network (LAN) and a wireless local area network (WLAN). Therefore, through the wireless network bridge, any computer equipped with a WLAN card may access and share resources within the cable-based LAN, or even within internet.

Ad-hoc network is one of the common application architectures for wireless local area network in the prior art. Briefly, Ad-hoc network facilitates direct interconnections between electronic devices (nodes) equipped with wireless network cards respectively, thereby allows the connected nodes to share resources with each other yet without transmitting through the aforesaid wireless network bridge. Therefore, Ad-hoc network does not require building up the conventional cable-based facilities so that the huge expenses for network constructions at the initial stage will no longer necessary.

However, in the single point (point-to-point) architecture of a Ad-hoc network, data transmission is only allowed to be transferred through one signal node. FIG. 2A shows an explanatory diagram of conventional data packet format for Wi-Fi wireless communication protocol under AD-hoc architecture in the prior art. Transmitting data through multiple nodes within the point-to-point Ad-hoc network would be difficult to achieve; this undoubtedly causes limitations of wirelessly transmitting data for the Ad-hoc network.

Therefore, how to resolve the relevant problems when transmitting data under Ad-hoc point-to-point architecture becomes a significant issue.

SUMMARY OF THE INVENTION

To solve the aforesaid problems of the prior art, the present invention provides a system and method for multiple nodes transmitting in an Ad-hoc network. Through the system and method of the present invention, data transmission is allowed to pass through multiple nods; namely, data are possible to be transmitted between multiple nodes. Therefore, data transmitting performance will be further improved.

In an aspect of the present invention, a multi-node transmission system is provided for multiple nodes to wirelessly transmit under an Ad-hoc network architecture. The system includes a data packet, an integration module, an initial node, at least one bridge node and a destination node. The data packet has a reservation column. The integration module integrates a multi-node transmission protocol into the reservation column of the data packet. The initial node transmits the integrated data packet. The bridge node, according to the multi-node transmission protocol, receives the integrated data packet transmitted from the initial node. The destination node, according to the multi-node transmission protocol, receives the integrated data packet transmitted from the bridge node.

In another aspect of the present invention, a multi-node transmission method is provided for multiple nodes to wirelessly transmit under an Ad-hoc network architecture. First of all, an integration module integrates a multi-node transmission protocol into a reservation column of a data packet. Next, an initial node transmits the integrated data packet. Afterwards, according to the multi-node transmission protocol, one or more bridge node receives the integrated data packet transmitted from the initial node. And finally, according to the multi-node transmission protocol, a destination node receives the integrated data packet transmitted from the bridge node.

In another aspect of the present invention, a data packet is provided to be transmitted wirelessly within a multi-node transmission system under an Ad-hoc network architecture. The data packet comprises a plurality of normal columns and a reservation column; wherein the multi-node transmission system comprises at least one integration module, an initial node, at least one bridge node and a destination node. The integration module integrates a multi-node transmission protocol into the reservation column of the data packet. The initial node transmits the integrated data packet. According to the multi-node transmission protocol, the bridge node receives the integrated data packet transmitted from the initial node. And according to the multi-node transmission protocol, the destination node receives the integrated data packet transmitted from the bridge node.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein:

FIG. 4 is a flow chart of a method for multi-nodes transmitting within Ad-hoc network according to the present invention.

DETAILED DESCRIPTION OF THE INVENTION

Figure 1:
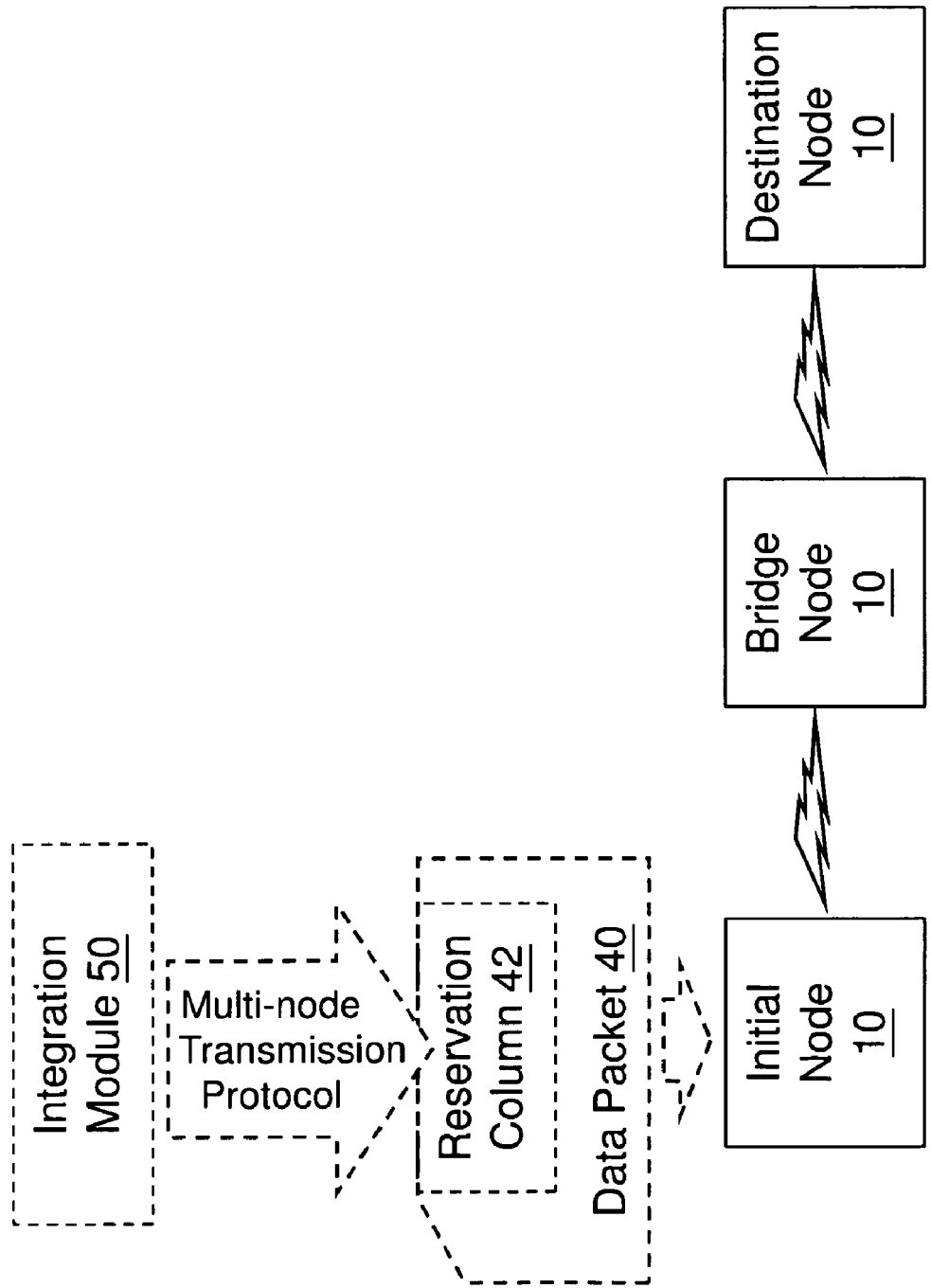
FIG. 1 is a first explanatory block diagram of a system for multi-nodes transmitting within Ad-hoc network according to the present invention.

Reference will now be made in detail to the present preferred embodiments of the invention, examples of which are illustrated in the accompanying drawings. Wherever possible, the same reference numbers are used in the drawings and the description refers to the same or the like parts.

Please refer to FIG. 1, which is a first explanatory block diagram of a system for multi-node transmitting within Ad-hoc network according to the present invention. The multi-node transmission system of the present invention includes an initial node 10, a bridge node 20, a destination node 30, a data packet 40 transmitted between the former 3 nodes and an integration module 50.

The data packet 40 comprises a reservation column 42. The reservation column 42 of the data packet is undefined section (s) within the wireless communication protocol, reserved parts. In the present invention, Wi-Fi wireless communication protocol is used as an example. Please refer to FIG. 2A and FIG. 2B; where FIG. 2A is an explanatory diagram of conventional data packet format for Wi-Fi wireless communication protocol in the prior art, and FIG. 2B is an explanatory diagram of an inventive data packet format for Wi-Fi wireless communication protocol according to the present invention.

Figure 2A:
FIG. 2A is an explanatory diagram of conventional data packet format for Wi-Fi wireless communication protocol in the prior art.
Figure 2B:
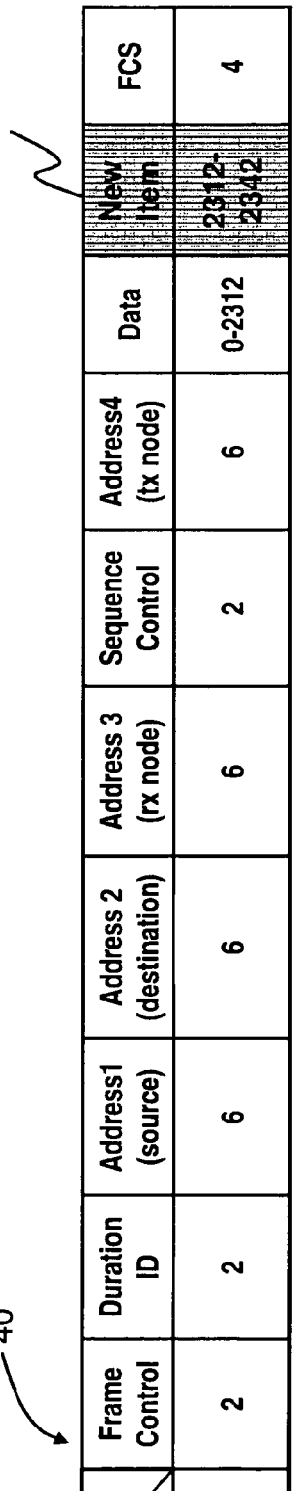
FIG. 2B is an explanatory diagram of an inventive data packet format for Wi-Fi wireless communication protocol according to the present invention.

In FIG. 2A, the bytes used by every items defined within a data packet of Wi-Fi communication protocol under Ad-hoc architecture are illustrated. About the "Data" column, the packet frame of Wi-Fi wireless communication protocol is defined as a 2330 bytes Maximum Transmission Unit (MTU), not including "Frame control" and "Address". In the case of bridging Ethernet and Wi-Fi, the Wi-Fi MTU may be redefined as 1500 bytes, which is the longest transmission length for transmitting data through Ethernet. Therefore, the undefined 1501~2330 bytes may be used as the reservation column 42 of the present invention. As shown in FIG. 2B, there are normal columns (not highlighted) and the reservation column 42. The undefined section (New Item column in the drawing) of the Wi-Fi wireless communication protocol is used as the reservation column 42 of the present invention. Consequently, the new packet frame of the data packet of the present invention is still compatible with Wi-Fi wireless communication protocol, and those unused sections within the data packet are further utilized.

The integration module 50 integrates a multi-node transmission protocol in the reservation column 42 of the data packet 40. The so-called multi-node transmission protocol includes relevant information required during transmitting through multiple nodes; further description regarding the multi-node transmission protocol is provided in below sections. With the integration module 50 integrating the multi-node transmission protocol into the reservation column 42 of the data packet 40, the data packet 40 may carry with the multi-node transmission protocol required for transmitting through multiple nodes, thereby achieves a multi-node transmission function under Ad-hoc network architecture. The integration module of the present invention may be realized by necessary hardware components and/or an application software installed on either each of the nodes, or only on specific node(s), or even equipped on a device independent from a node yet connected therewith, and all included within an Ad-hoc network. On all the nodes, there may be equipped with a reading module (not shown) to read the multi-node transmission protocol integrated in the data packet and the nodes will process the data packet according to the read multi-node transmission protocol.

Figure 3:
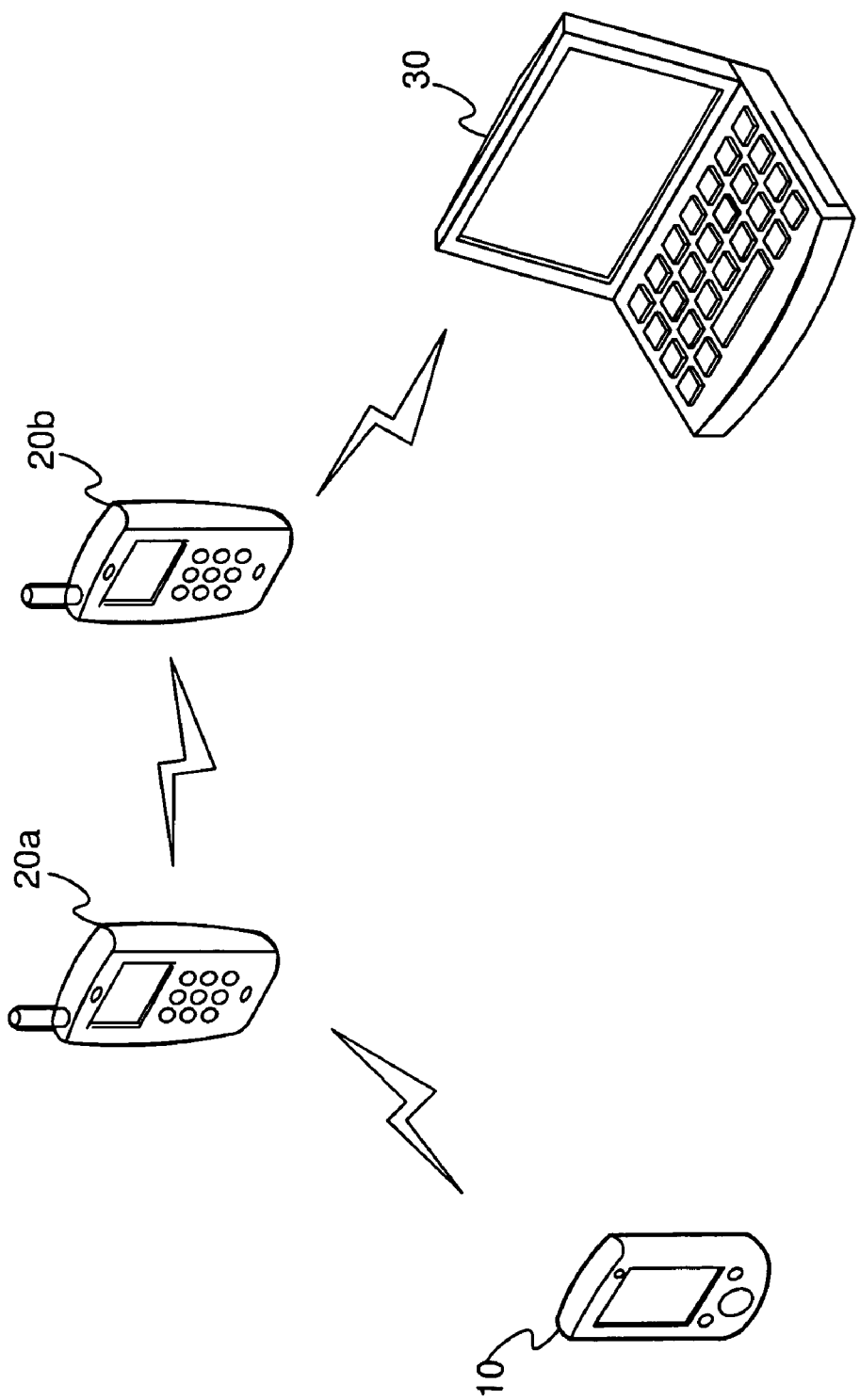
FIG. 3 is a second explanatory block diagram of a system for multi-nodes transmitting within an Ad-hoc network according to the present invention.

Please refer to FIG. 1 and FIG. 3 in parallel. First of all, the initial node 10 transmits the data packet 40 that has its reservation column 42 integrated with the multi-node transmission protocol. The data packet 40 with the multi-node transmission protocol is prepared by the integration module 50 equipped in the initial node 10 or connected with the initial node 10. Therefore, when the initial node 10 has the data packet 40 integrated with the multi-node transmission protocol, the data packet 40 will be transmitted to the next node (the bridge node 20a) according to the multi-node transmission protocol. At this moment, the bridge node 20 receives the data packet 40 transmitted from the initial node 10 according to the integrated multi-node transmission protocol; wherein the amount of the bridge nodes depends by requirements such as the transmission distance or intensity of the transmitted wireless signal. It is possible that a path planning program and/or hardware components are provided (i.e. through or not through the integration module 50) to at least one of the nodes so as to find out the optimal bridge node(s). Eventually, according to the multi-node transmission protocol, the destination node 30 receives the data packet 40 transmitted from the bridge node 20 and complete the whole transmission process of the data packet 40.

Please refer to FIG. 3, which is a second explanatory block diagram of a system for multi-nodes transmitting within an Ad-hoc network according to the present invention. For those conventional point-to-point/single-point technologies under Ad-hoc architecture, the transmission path of the data packet 40 is only from the initial node 10 to the destination node 30; namely the data packet 40 can only be transmitted from one node to another and it is not capable of transmitting through multiple nodes. Such limitation obviously descends the data transmission capability under the Ad-hoc network architecture. As shown in the drawing, with the multi-node transmission system proposed by the present invention, the data packet 40 can be transmitted from the initial node 10 not only to the destination node 30 directly but also to the bridge node 20a or even the bridge node 20b between the initial node 10 and the destination node 30, thereby achieves the multi-node transmission function under the Ad-hoc network architecture. In FIG. 3, the initial node 10, the bridge node 20 and the destination node 30 may be mobile phone, notebook computer or PDA (Personal Digital Assistant) and other electronic devices that have capability of wireless communication.

Beside, although the foregoing embodiment uses Wi-Fi wireless communication protocol as examples, it should not be taken as the limitations of the present invention solely. The wireless communication protocols practical for the multi-node transmission system of the present invention may be Wi-Fi, Bluetooth or "Wireless Access in the Vehicular Environment" (WAVE) or a combination of the foregoing and other different wireless communication protocols. Namely, each of the pairs of the initial node and the bridge node, and the initial node and the destination node uses the wireless communication protocol mentioned above to connect with each other respectively.

The following section aims to further explain parameters required/included in the multi-node transmission protocol. The multi-node transmission protocol may include transmission-type parameter that records the transmission type of the data packet 40. Two (2) bytes (not limited) within the data packet 40 are provided to store the transmission-type parameter. The transmission-type parameter mainly indicates two different situations: one represents that a conventional data packet is transmitted, namely a single point transmission packet; another represents that the data packet integrated with the multi-node transmission protocol according to the present invention is transmitted, namely a multi-node transmission packet. Therefore, from the transmission-type parameter of the multi-node transmission protocol, the nodes in the transmission path will know whether it is single-point transmission or multi-node transmission.

The multi-node transmission protocol may further include a first node parameter that records the amount of the bridge nodes 20 through which the data packet 40 needs to be transmitted. Six (6) bytes (not limited) of the data packet 40 may be used to record the first node parameter. Through the first node parameter of the multi-node transmission protocol, aside from the amount of the bridge nodes 20 through which the data packet 40 needs to be transmitted can be recorded, an optimal transmission path may also be obtained by certain path planning methods. For example, through the method of Received Signal Strength Indication (RSSI), it is practical to dynamically find out the node(s) that has the best transmission capability within the Ad-hoc network architecture, and then use it as the bridge node 20a/b in the transmission path.

Furthermore, the multi-node transmission protocol may further include a second node parameter that records the node ID (identification) number of the destination node 30. Six (6) bytes (not limited) of the data packet 40 may be used to record the second node parameter. Through the second node parameter of the multi-node transmission protocol, the nodes will be able to determine where the data packet 40 is transmitted thereto. Therefore, the data packet 40 may be transmitted through the bridge node 20a/b to the destination node 30, and complete the processes of multi-node wireless transmission under Ad-hoc network architecture.

Moreover, the multi-node transmission protocol may further include a length parameter that records the overall data length of the multi-node transmission protocol; namely the length parameter will record the overall bytes used by the foregoing transmission-type parameter, the first node parameter, the second node parameter and the length parameter itself, which means the entire bytes within the data packet 40 used by the whole multi-node transmission protocol. According to the length parameter, every node will be able to verify whether the multi-node transmission protocol is correct or not. That means the length parameter may be used for debugging the multi-node transmission protocol.

Please refer to FIG. 4, which is a flow chart of a method for multi-nodes transmitting within Ad-hoc network according to the present invention. The method comprises the following steps.

Step S10: Integrate a multi-node transmission protocol into a reservation column of a data packet.

Step S10 may further includes the following step of: integrate a transmission-type parameter into the multi-node transmission protocol, wherein the transmission-type parameter records a transmitting type of the data packet.

Step S10 may further includes the following step of: integrate a first node parameter into the multi-node transmission protocol, wherein the first node parameter records the amount of the bridge node(s) through which the data packet 40 needs to be transmitted.

Step S10 may further includes the following step of: integrate a second node parameter into the multi-node transmission protocol, wherein the second node parameter records a node ID (identification) number/address of the destination node.

Step S10 may further includes the following step of: integrate length parameter into the multi-node transmission protocol, wherein the length parameter records the overall data length of the multi-node transmission protocol. According to the length parameter, every node will be able to verify whether the multi-node transmission protocol is correct or not; namely, the length parameter may be used to verify the correctness of the multi-node transmission protocol Step S20: transmit the data packet from the initial node.

Step S30: according to the multi-node transmission protocol, at least one bridge node receives the data packet transmitted from the initial node.

Step S40: according to the multi-node transmission protocol, a destination node receives the data packet transmitted from the bridge node.

Aside from the multi-node transmission system and method disclosed above, a data packet is also provided by the present invention in parallel to be transmitted wirelessly within a multi-node transmission system under an Ad-hoc network architecture. The data packet comprises a plurality of normal columns and a reservation column; wherein the multi-node transmission system comprises at least one integration module, an initial node, at least one bridge node and a destination node. The integration module integrates a multi-node transmission protocol into the reservation column of the data packet. The initial node transmits the integrated data packet. According to the multi-node transmission protocol, the bridge node receives the integrated data packet transmitted from the initial node. And according to the multi-node transmission protocol, the destination node receives the integrated data packet transmitted from the bridge node.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A multi-node transmission system under an ad-hoc network architecture for a plurality of nodes using a wireless communication protocol to connect with each other, comprising:
    a data packet configured according to the wireless communication protocol and comprising a plurality of columns defining data required to communicate according to the wireless communication protocol and a reservation column which is not used to define data required to communicate according to the wireless communication protocol;
    at least one integration module, integrating a multi-node transmission protocol into the reservation column of the data packet, wherein the multi-node transmission protocol includes information required for transmitting through multiple nodes;
    an initial node, transmitting the integrated data packet;
    at least one bridge node, according to the multi-node transmission protocol, receiving the integrated data packet transmitted from the initial node; and
    a destination node, according to the multi-node transmission protocol, receiving the integrated data packet transmitted from the bridge node.

2. The multi-node transmission system as claimed in claim 1, wherein the multi-node transmission protocol comprises:
    a transmission-type parameter that records a transmission type of the integrated data packet.

3. The multi-node transmission system as claimed in claim 1, wherein the multi-node transmission protocol comprises:
    a first node parameter that records the amount of the bridge node through which the integrated data packet needs to be transmitted.

4. The multi-node transmission system as claimed in claim 1, wherein the multi-node transmission protocol comprises:
    a second node parameter that records a node ID (identification) number of the destination node.

5. The multi-node transmission system as claimed in claim 1, wherein the multi-node transmission protocol comprises:
    a length parameter that records an overall data length of the multi-node transmission protocol.

6. The multi-node transmission system as claimed in claim 1, wherein the wireless communication protocol is selected from a group consisting of Wi-Fi, Bluetooth, Wireless Access in the Vehicular Environment (WAVE) and a combination of the foregoing.

7. The multi-node transmission system as claimed in claim 1, wherein the bridge node and the destination node each comprises:

a reading module, reading the multi-node transmission protocol integrated in the data packet, the bridge node and the destination node processing the integrated data packet according to the multi-node transmission protocol read by the reading module.

8. A multi-node transmission method under an ad-hoc network architecture for a plurality of nodes using a wireless communication protocol to connect with each other, comprising the steps of:

integrating a multi-node transmission protocol into a reservation column of a data packet configured according to the wireless communication protocol, wherein the data packet comprises a plurality of columns defining data required to communicate according to the wireless communication protocol and the reservation column which is not used to define data required to communicate according to the wireless communication protocol, and wherein the multi-node transmission protocol includes information required for transmitting through multiple nodes;

an initial node transmitting the integrated data packet;

according to the multi-node transmission protocol, at least one bridge node receiving the integrated data packet transmitted from the initial node; and according to the multi-node transmission protocol, a destination node receiving the integrated data packet transmitted from the bridge node.

9. The multi-node transmission method as claimed in claim 8, wherein the step of integrating multi-node transmission protocol comprises the step of:

integrating a length parameter into the multi-node transmission protocol;

wherein the length parameter records an overall data length of the multi-node transmission protocol.

10. The multi-node transmission method as claimed in claim 9 further comprising the step of:

according to the length parameter, verifying the correctness of the multi-node transmission protocol.

11. The multi-node transmission method as claimed in claim 8, wherein the wireless communication protocol is selected from a group consisting of Wi-Fi, Bluetooth, Wireless Access in the Vehicular Environment (WAVE) and a combination of the foregoing.

12. The multi-node transmission method as claimed in claim 8, wherein the step of integrating multi-node transmission protocol comprises the step of:

integrating a first node parameter that records the amount of the bridge node through which the integrated data packet needs to be transmitted.

13. The multi-node transmission system as claimed in claim 8, wherein the step of integrating multi-node transmission protocol comprises the step of:

integrating a second node parameter that records a node ID (identification) number of the destination node.

14. The multi-node transmission system as claimed in claim 8, wherein the bridge node and the destination node each comprises:

a reading module, reading the multi-node transmission protocol integrated in the data packet, the bridge node and the destination node processing the integrated data packet according to the multi-node transmission protocol read by the reading module.

\* \* \* \* \*